July 3, 1945.  F. W. FOISY  2,379,632
DUCT SYSTEM
Filed Dec. 10, 1942  3 Sheets-Sheet 1

INVENTOR
Francis W. Foisy
BY J. Stanley Churchill
ATTORNEY

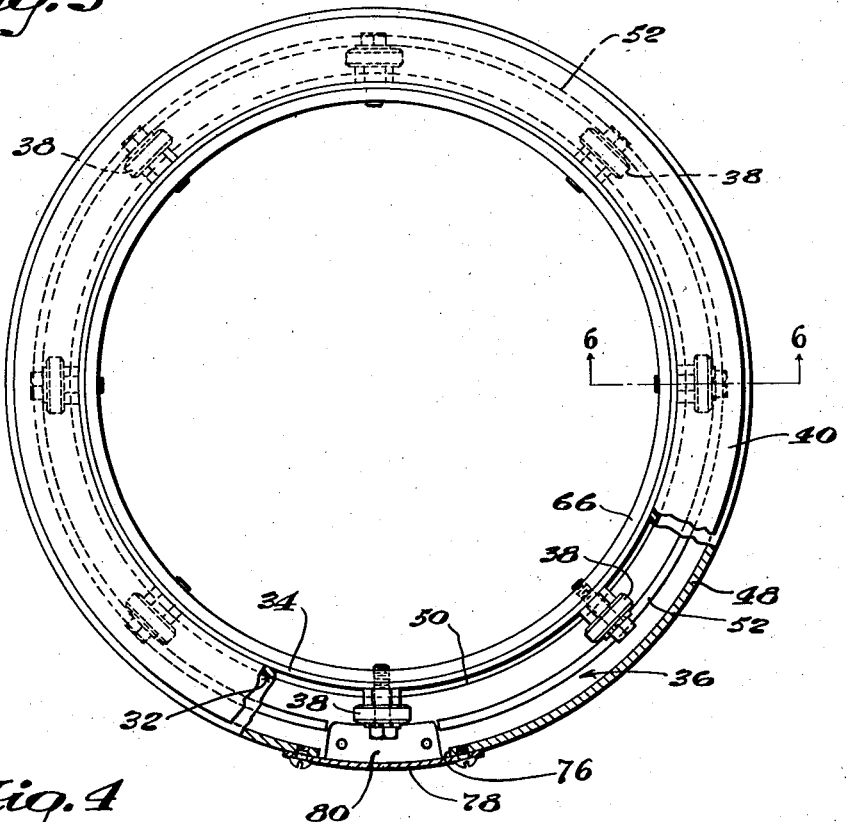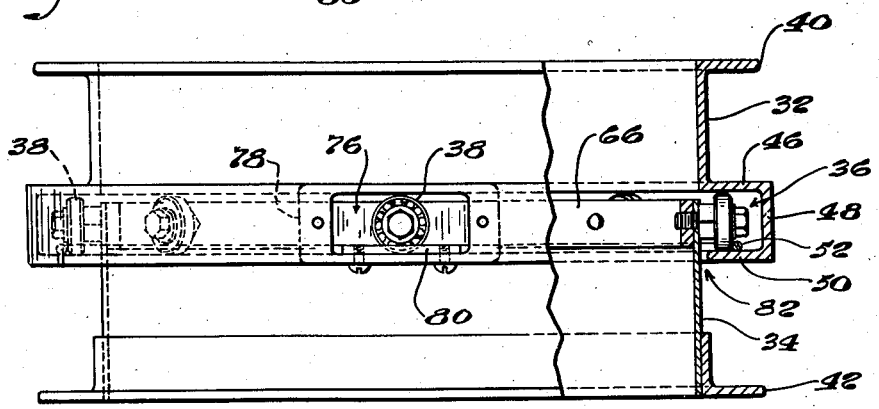

July 3, 1945.  F. W. FOISY  2,379,632
DUCT SYSTEM
Filed Dec. 10, 1942  3 Sheets-Sheet 3
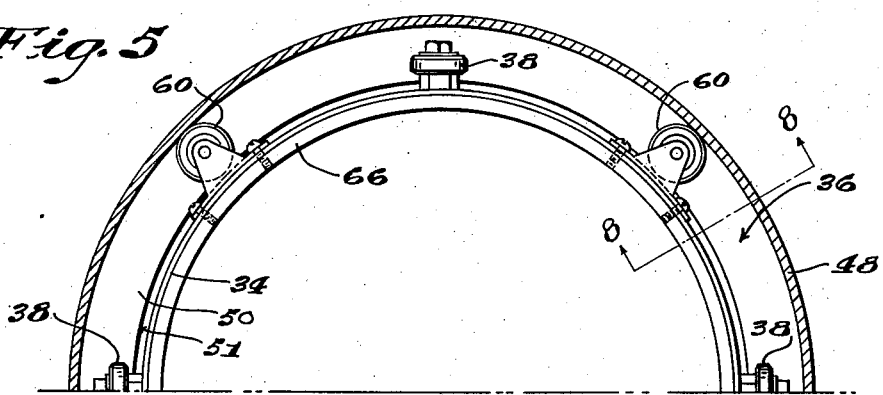
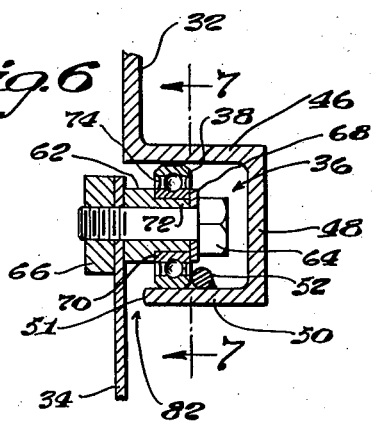
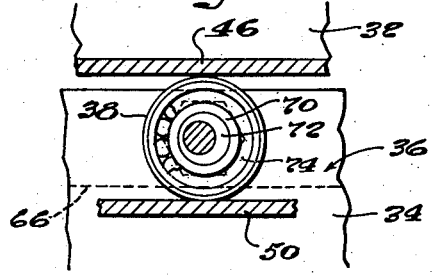
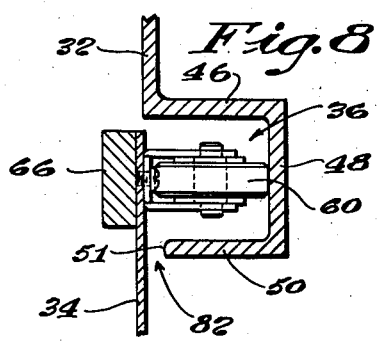
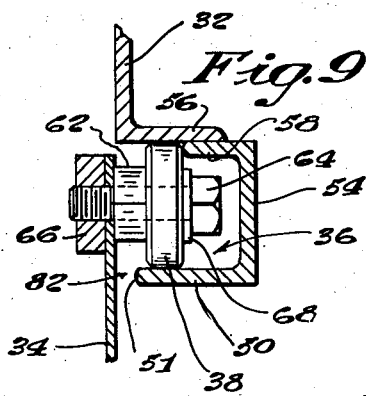
INVENTOR
Francis W. Foisy
BY J. Stanley Churchill
ATTORNEY Patented July 3, 1945

2,379,632

UNITED STATES PATENT OFFICE 2,379,632

DUCT SYSTEM

Francis W. Foisy, Brighton, Mass., assignor to Delbrook Ventilating Co., Cambridge, Mass., a corporation of Massachusetts Application December 10, 1942, Serial No. 468,471

3 Claims. (Cl. 285—97.3)

This invention relates to a duct system and more particularly to a ventilating system and to a swivel connection for use in such systems.

The invention has for an object to provide a novel duct system and particularly a ventilating system for exhausting dust and fume laden air, embodying a novel swivel connection by which one section of the duct system, such as the lower inlet section, may be moved to different locations with minimum effort. The novel swivel connection unit is of a construction which may be economically manufactured, easily installed and replaced and the operating parts thereof adjusted in a simple manner.

With this general object in view, and such others as may hereinafter appear, the invention consists in the swivel connection and in the various structures, arrangements and combinations of parts, hereinafter described and particularly defined in the claims at the end of this specification.

Figure 1:
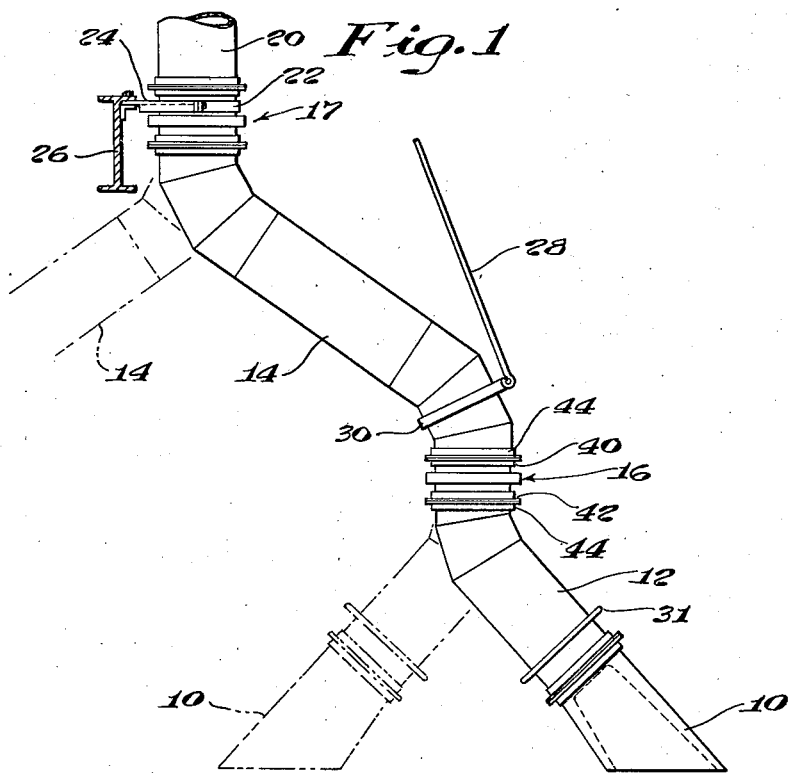
Figure 2:
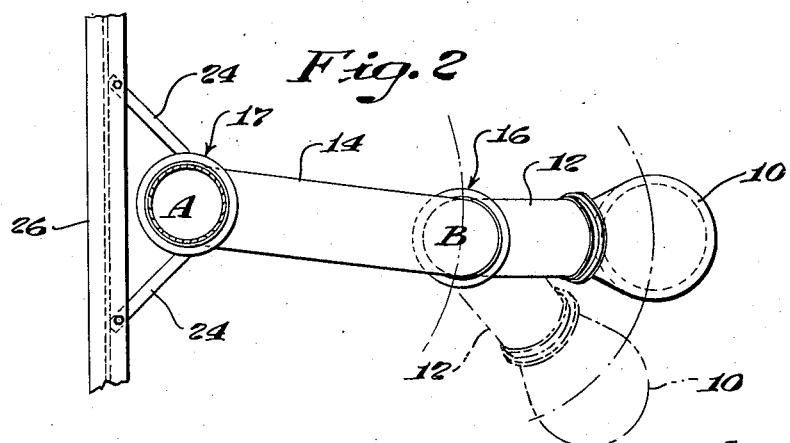

In the drawings illustrating the preferred embodiment of the invention, Fig. 1 is a side elevation of an air inlet portion of an exhaust system embodying the present invention; Fig. 2 is a plan view of the same; Figs. 3 and 4 are plan and side elevations respectively of the present swivel connection, portions being broken away to more clearly illustrate the invention; Fig. 5 is a partial plan view illustrating a modified form of the present swivel connection; Fig. 6 is an enlarged detail view in cross section taken on the line 6—6 of Fig. 3; Fig. 7 is a cross sectional view taken on the line 7—7 of Fig. 6; Fig. 8 is a cross sectional view taken on the line 8—8 of Fig. 5; and Fig. 9 is a cross sectional detail view of a modified construction, to be referred to.

In general, the present invention contemplates a novel and superior construction of a swivel connection for use generally in a piping or duct system, herein illustrated as an exhausting system, having a suction duct or hood designed to be moved to different points of service. For example, the invention contemplates an installation in a foundry where at one time the hood may be positioned over an electric furnace and at another time, positioned over the mould to collect and draw away the fumes therefrom.

In prior similar ventilating systems having movable duct portions of this character, the swivel joints, so far as I am aware, comprise sections fitted together with a relatively large area of each section in frictional contact so that such prior connections are exceedingly difficult to move or rock from one operating position to another and, because of such frictional engagement, are subject to rapid and excessive wear and require frequent replacement. In accordance with the present invention the swivel connection includes a plurality of anti-friction members in one section adapted to be received in a track or raceway provided in its connecting section so as to reduce the friction of the contacting parts to a minimum and to permit movement of the hooded section from one position to another with a minimum of effort, even in relatively large and heavy installations.

Another feature of the invention resides in the construction of the swivel connection by which it may be easily embodied in a piping system, flanged portions being preferably provided at each end of the swiveled unit for attachment to corresponding flanged portions provided on the connecting pipes. With this construction, it is unnecessary to cut out sections of pipe to be replaced by new sections telescoped together as is the present practice when replacing a swivel connection unit. Other features include a novel mounting for the anti-friction members whereby they may be adjusted to obtain a uniform bearing of all the rollers against the track surface as will be hereinafter more fully described.

Referring now to the drawings which illustrate the invention as embodied in a ventilating system, Fig. 1 represents the movable portion of an exhaust system in which 10 indicates a suction hood attached to an angularly disposed duct 12 swivelly connected at its upper end to a second duct 14 by a swivel connection indicated generally at 16. The swivel connection 16, at this point, permits revolution of the duct 12 in an arc as indicated to enable the hood 10 to be swung to different positions. In practice, at least two swivel connections are preferably employed in an installation, and, as herein shown, the duct 14 is also angularly disposed and provided at its upper end with a swivel connection 17 which permits revolution of the entire unit so that, in operation, it will be observed that the suction hood 10 may be positioned at practically any point within the maximum radius described by the extended angular ducts 12 and 14. Different positions of the ducts are indicated in dotted lines in Figs. 1 and 2, the swivel connection 17 permitting rotation to bodily revolve the connection 16 about the center A, and, the swivel connection 16 permitting revolution of the hood 10 about the center B, as clearly shown in Fig. 2. The swivel connection 17 connects the movable portion of the exhaust system to a vertically disposed duct 20 leading to the exhaust fan, not shown, and, the unit may be supported at a point above the swivel connection 17 in any usual or preferred manner, herein shown as by a collar 22 clamped about the stationary portion of the swivel connection 17 and connected by angle members 24 to an I-beam 26 forming a part of the building structure. The overhung portion of the unit may also be supported, as illustrated, by a rod 28 connected at one end to a collar 30 on the duct 14 and connected at its other end to a point above provided with a swivel joint, not shown, to permit rotation of the rod 28 with the unit whereby to relieve the swivel connection 17 of some of the strain of the overhung portion. However, such collateral support may be eliminated if desired since the present swivel connection is designed to support a relatively large and heavy overhung portion without undue strain thereon and at the same time permitting rotation thereof with a minimum of effort. A hand wheel 31 may be provided on the duct 12 adjacent the hood 10, as shown, for convenience in moving the duct.

Referring now to Figs. 3 and 4, the swivel connections 16, 17 embodied in the ventilating system above described comprise essentially two cylindrical pipe sections 32, 34, the upper section 32 being provided with an annular raceway or tract portion 36, and, the lower section 34 being provided with a plurality of ball bearing rollers 38 radially extended from the upper edge thereof and arranged to be received in the annular raceway 36. Each section 32, 34 is provided with a flanged portion 40, 42 designed for attachment by bolts or otherwise to correspondingly flanged portions 44 provided on adjacent pipe sections in the assembled unit as shown in Fig. 1. The flanged portions of a swivel connection may be formed integrally with the pipe section as indicated at 40, or, an annular angle piece may be welded or otherwise secured to the pipe section as indicated at 42. Thus, a swivel connection unit may be easily and quickly assembled with the ducts, and, when replacement is required it is merely necessary to remove the bolts holding the flanges together and inserting a new unit without cutting or replacing any of the main pipe structures.

As illustrated in Fig. 4, the annular raceway 36 is disposed in an outwardly extending or offset portion comprising an upper wall 46, a vertical wall 48 and a lower wall 50 forming a protective covering for the rollers outside the main duct area. With this construction, the swivel connection permits a substantially uniform duct area to be maintained in the two sections 32, 34 so as not to impede the passage of dust and gases therethrough and also serves to protect the track and rollers from direct contact with the foreign matter passing through the ducts.

The height of the raceway 36 is preferably approximately equal to the diameter of the rollers 38 with sufficient clearance to assure free running thus preventing tipping or vertical displacement of one section with relation to the other. In operation, the rollers 38 may bear against either the upper wall 46 or the lower wall 50 depending upon the strain imposed by the depending and overhanging portion of the duct. Provision is also made for preventing lateral displacement of one section with respect to the other and, as herein shown, an annular rod 52, circular in cross section, may be welded to the lower wall 50 to form a guide against which the roller edges may engage. A modified form of lateral guide is illustrated in Fig. 9 wherein the raceway 36 may be formed by an annular member 54, U-shaped in cross section, and welded to a flanged portion 56 extending from the cylindrical section 32, the upper leg 58 of the U-shaped member being positioned to form a guide for the upper edge of the roll 38. Thus, the swivel section 34 is guided in the raceway 36 in a manner such as to prevent both vertical and lateral displacement thereof and provides an efficient connection capable of being rotated to present the air inlet hood 10 from one position of operation to another with a minimum of effort.

While the above described structures for preventing lateral movement of the lower section 34 with respect to the upper section 32 are highly satisfactory in most installations, it may be desired in some instances, particularly in a system having unusually large and heavy ducts, to provide horizontally mounted rollers 60, as illustrated in Figs. 5 and 8, for engagement with the vertical wall 48 of the raceway 36. In such instances, it is preferred to alternate the rollers about the circumference of the track, having first a vertically mounted roller 38 for engagement with the lower wall 50 and then a horizontally mounted roller 60 for engagement with the vertical wall 48 and so on around the track. In the latter embodiment of the invention, the guide rod 52 may be eliminated.

As illustrated in detail in Figs. 6 and 7, each roller 38 is carried by an eccentric bushing 62 adjustably mounted upon a bolt 64 received in and radially extending from the upper edge of the cylindrical section 34. A reenforcing bar or ring 66 may be provided around the upper edge of the section 34 into which the threaded end of the bolt 64 extends and, a washer 68 may be provided under the head of the bolt, as shown. The fixed ball race 70 of the ball bearing roller 38 may be pressed onto the eccentric portion 72 of the bushing 62 to form an integral part thereof. With this construction, the eccentric mounting permits adjustment of the roller center so as to cause all the rollers to bear uniformly against their adjacent track surface and to thus bear their individual share of the load. For example, where the center of gravity of the depending portion of the duct substantially coincides with the axis line of the swivel unit, all of the rollers may be accurately adjusted to bear evenly against the lower wall 50 of the track. The utility of this feature will be apparent from consideration of a condition where if the center of an intermediate roller 38 were slightly higher than the two adjacent rollers on either side, it will be seen that the intermediate roller would merely ride around without engaging the track thus causing an extra load to be placed on the adjacent rollers. In the illustrated exhaust system, where there is a considerable overhang of the depending portion, it will be seen that those rollers situated on that side of the axis line of the unit which is remote from the center of gravity of the overhanging portion of the duct, will bear against the upper wall 46 of the track due to the turning movement exerted on the movable section of the duct, while those rollers nearest the overhanging portion will bear against the lower wall 50 of the track. Since the rollers are carried by the depending portion, it will be seen that this relationship is maintained during the rotation thereof so that adjustment of the rollers to bear uniformly against their respective surfaces will maintain the depending portion in a uniform position during revolution thereof and assure smooth and efficient operation. The ball bearing rollers 38 may and preferably will be of the type provided with sealing rings indicated at 74 to render the bearings substantially dust proof.

In order to assemble the roller units and to permit adjustment thereof, the vertical wall 48 of the raceway is provided with an access opening 76 which may be closed by a cover member 78. A detachable segmental guide piece 80 is provided for the lower wall 50 adjacent the access opening to form a continuation of the guide rod 52 and which may be removed during the assembling operation. With this construction, it will be seen that a roller unit may be inserted through the access opening and attached to the pipe section 34 whereupon the latter is rotated to present the succeeding point of attachment adjacent the access opening. In order to facilitate adjustment of the rollers, as above described, the eccentric member 62 is provided with an hexagonal portion which may be engaged by a relatively narrow wrench extended through the space 82 between the pipe section 34 and the edge 51 of the lower wall 50. The bolt 64 is then loosened by a wrench extended through the access opening. The eccentric bushing 62 may then be rotated to adjust the center of rotation of the roller 38 in the desired position whereupon the bolt 64 may be again tightened up to hold the parts in their assembled and adjusted position. In addition to serving as a convenient means of assembling, adjusting and replacing ball bearing units in the swivel connection, the access opening also provides a convenient opening for lubricating and cleaning the track and rollers.

As above described, the present swivel structure is preferably formed outside the path of travel of the gases and foreign matter passing through the ducts so that accumulation of such foreign matter in the track 36 is reduced to a minimum. It will also be observed that the track structure is formed so as to prevent any condensate which forms on the interior wall of the upper pipe section 32 and connecting ducts, from entering into the track or raceway. As herein shown, the upper section 32 overhangs the inner edge 51 of the lower wall 50 so that any condensate dripping off the upper section 32 will fall outside the track area or run down the outer wall of the lower section 34. Thus, the raceway 36 is maintained substantially free from dirt and moisture.

From the above description, it will be observed that the present ventilating or exhausting system is provided with a swivel connection which provides a simple and efficient structure, requiring but a minimum of effort to move the swiveled portion from one position of operation to another and which is capable of relatively long wear and trouble free service. Although the present swivel connection has been herein illustrated and described as embodied in a ventilating or exhausting system it will be obvious that the swivel connection is adapted for general use in other types of piping and duct systems where one portion is desired to be rocked with relation to the other.

While the preferred embodiment of the invention has been herein illustrated and described, it will be understood that the invention may be embodied in other forms within the scope of the following claims.

Having thus described the invention, what is claimed is:

1. In a ventilator conduit of the type composed of a plurality of connected metal pipe sections, the combination of an upper pipe section, a lower pipe section and a swivel unit interposed between and secured to said upper and lower pipe sections, said swivel unit comprising an upper sleeve secured to the lower end of the upper pipe section and of substantially the diameter thereof, said sleeve having a U-shaped circular track portion at its lower end extended radially outwardly therefrom with the open mouth of the U-shaped portion disposed inwardly, a second sleeve secured to the upper end of the lower ventilator pipe section and of substantially the diameter of the upper sleeve, said second sleeve having its upper end disposed in a plane common to said U-shaped track and carrying a series of circumferentially spaced rollers received in said track and having their axes disposed perpendicular to the axis of said second sleeve whereby to rotatably suspend said second sleeve and its associated ventilator pipe section with respect to said upper sleeve and its associated ventilator pipe section.

2. In a ventilator conduit of the type composed of a plurality of connected metal pipe sections, the combination of an upper pipe section, a lower pipe section and a swivel unit interposed between and secured to said upper and lower pipe sections, said swivel unit comprising an upper sleeve secured to the lower end of the upper pipe section and of substantially the diameter thereof, said sleeve having a U-shaped circular track portion at its lower end extended radially outwardly therefrom with the open mouth of the U-shaped portion disposed inwardly, a second sleeve secured to the upper end of the lower ventilator pipe section and of substantially the diameter of the upper sleeve, said second sleeve having its upper end disposed in a plane common to said U-shaped track and carrying a series of circumferentially spaced rollers received in said track and having their axes disposed perpendicular to the axis of said second sleeve whereby to rotatably suspend said second sleeve and its associated ventilator pipe section with respect to said upper sleeve and its associated ventilator pipe section, and guiding means mounted upon said U-shaped portion of the circular track cooperating with said rollers for preventing outward movement thereof.

3. In a ventilator conduit of the type composed of a plurality of connected metal pipe sections, the combination of an upper pipe section, a lower pipe section and a swivel unit interposed between and secured to said upper and lower pipe sections, said swivel unit comprising an upper sleeve secured to the lower end of the upper pipe section and of substantially the diameter thereof, said sleeve having a U-shaped circular track portion at its lower end extended radially outwardly therefrom with the open mouth of the U-shaped portion disposed inwardly, a second sleeve secured to the upper end of the lower ventilator pipe section and of substantially the diameter of the upper sleeve, said second sleeve having its upper end disposed in a plane common to said U-shaped track and carrying a series of circumferentially spaced rollers received in said track and having their axes disposed perpendicular to the axis of said second sleeve whereby to rotatably suspend said second sleeve and its associated ventilator pipe section with respect to said upper sleeve and its associated ventilator pipe section, said second sleeve having a series of circumferentially spaced rollers mounted thereon received in said track and cooperating with the inner surface of the outer wall thereof and having their axes disposed parallel to the axis of said second sleeve.

FRANCIS W. FOISY.